United States Patent [19]
Cox et al.

[11] 3,797,446
[45] Mar. 19, 1974

[54] MOBILE POWER UNIT

[76] Inventors: Lyle G. P. Cox; Ralph J. Cibula, both of General Delivery, Gladstone, Manitoba, Canada

[22] Filed: Dec. 19, 1972

[21] Appl. No.: 316,574

[52] U.S. Cl. ............... 115/6.1, 180/19 R, 180/99, 192/129 A
[51] Int. Cl. ............................. A63c 11/10
[58] Field of Search ........ 115/6, 6.1, 70, .5 R, 22.3; 114/235 R, 235 WS, 66.5 R; 180/103, 104, 96, 99, 19 R; 188/110, 119; 192/129 A, 129 R; 200/61.41, 61.42, 61.43, 61.44

[56] References Cited
UNITED STATES PATENTS

| | | | |
|---|---|---|---|
| 3,181,493 | 5/1965 | Perkut | 115/6.1 |
| 2,776,443 | 1/1957 | Howard | 115/6.1 |
| 3,411,166 | 11/1968 | Kimmel | 115/22.3 |
| 2,914,018 | 11/1959 | Schachner et al. | 115/6.1 |

FOREIGN PATENTS OR APPLICATIONS

| | | | |
|---|---|---|---|
| 864,217 | 1/1953 | Germany | 115/6.1 |

*Primary Examiner*—Duane A. Reger
*Assistant Examiner*—Randolph A. Reese
*Attorney, Agent, or Firm*—Stanley G. Ade

[57] ABSTRACT

A source of power drives the device on land or water. A pair of elongated handles extend forwardly of the device between which the operator is positioned. Water or snow skis, wheel skates or skis, a togobban platform and wheels and the like are worn or used by the operator depending upon the medium upon which the device is used. A travel surface activated assembly automatically shuts off the source of power and provides braking of the unit thus preventing the unit from running over the operator in the event that the operator falls. The actuator assembly operates either if the operator falls accidentally or, alternatively, if he lowers the handles so that the actuator engages the surface. The entire unit is designed to be easily folded or disassembled so that it can be carried in the trunk of a car or the like.

20 Claims, 13 Drawing Figures

PATENTED MAR 19 1974

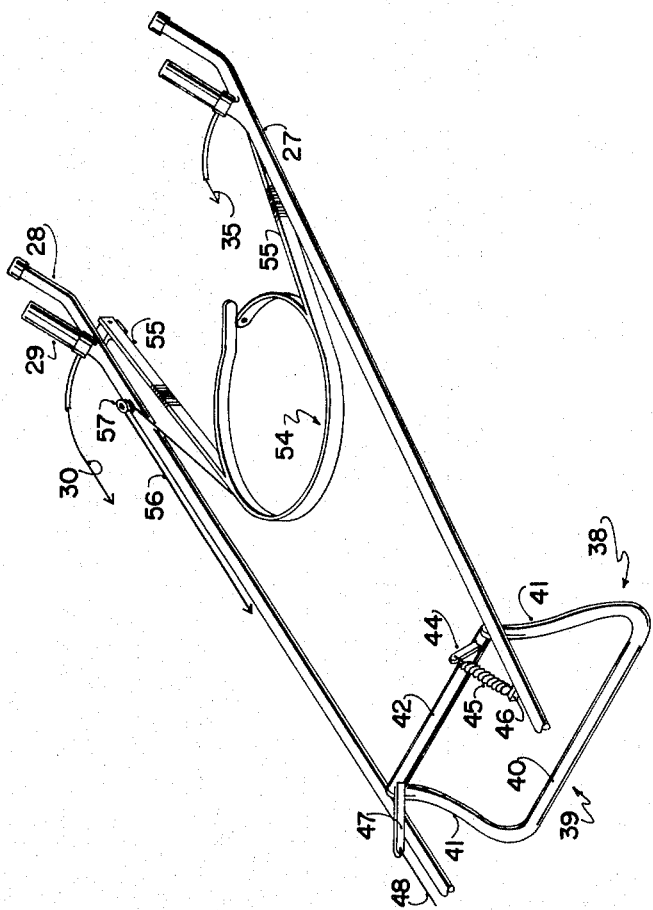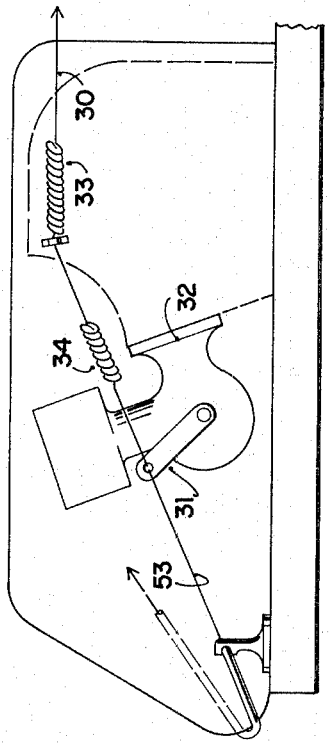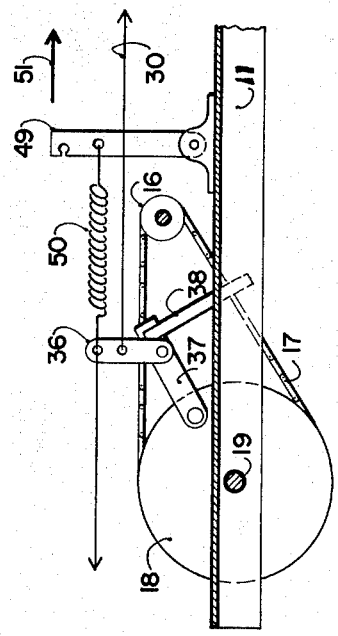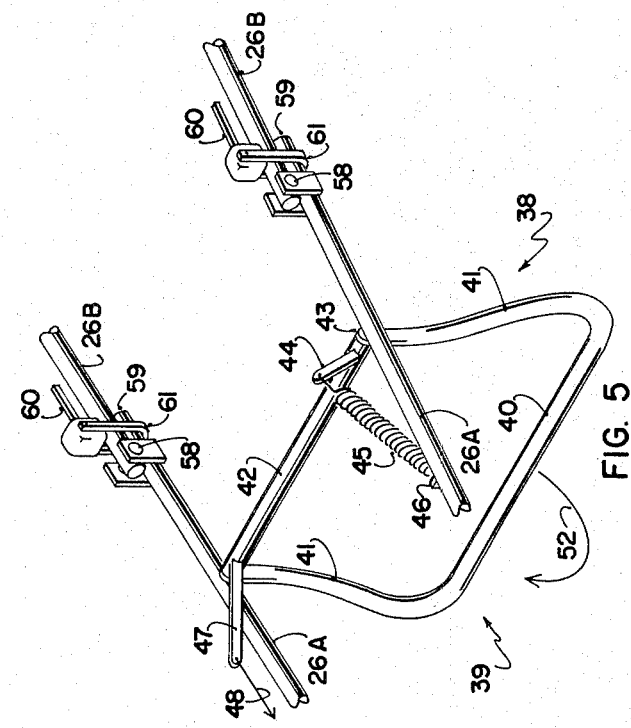

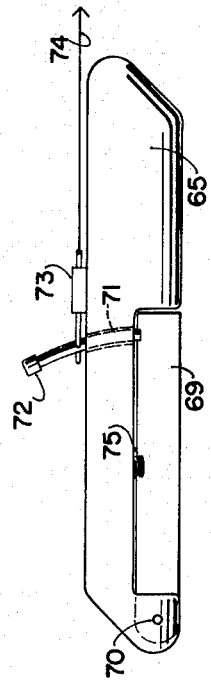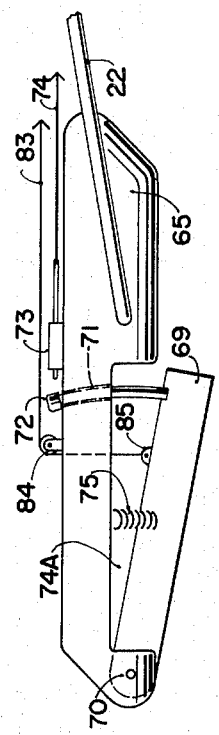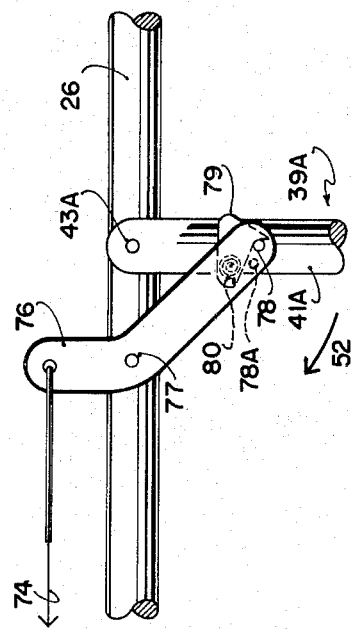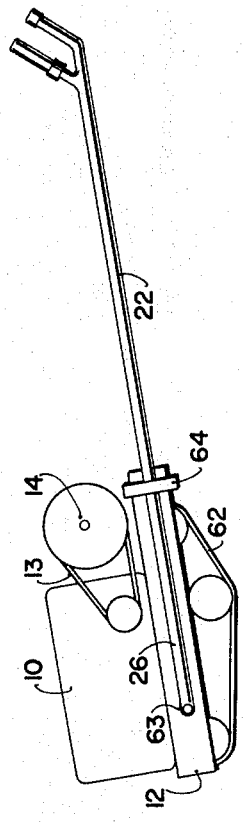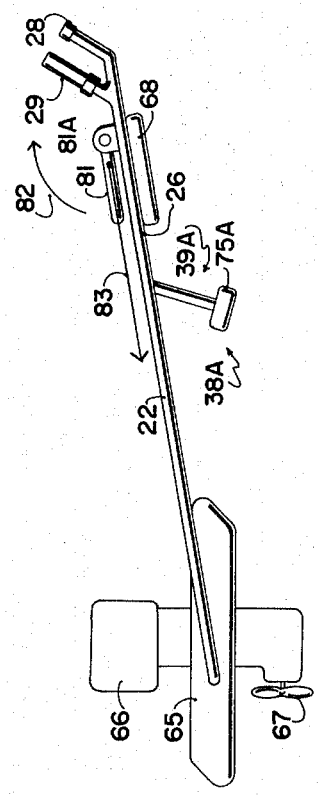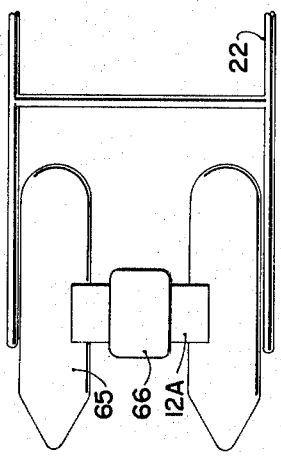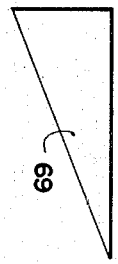

MOBILE POWER UNIT

BACKGROUND OF THE INVENTION

This invention relates to new and useful improvements in mobile power units adapted to be used on either land or water.

Conventionally both water and land skiers are pulled behind a source of power such as a boat in the case of water, and a snowmobile or the like, in the case of land skiing.

In both instances a relatively heavy and expensive piece of equipment is utilized requiring an operator independently of the individual who is skiing. Furthermore the individual is always pulled by such devices and in the case of land skiing, this is an unnatural method of propulsion.

The present device overcomes all of these disadvantages by providing a mobile power unit which is readily adaptable for use on both land and water. Furthermore insofar as use on land is concerned, it is useable on grass, soft snow, packed snow, road surfaces and the like, the principal difference between various uses being the apparatus worn by the operator. In the case of snow, conventional skis can be used and in the case of grass then skis with rollers may be utilized. If used on road surfaces and the like then skate-like devices may be worn by the operator. The above gives some examples of the flexibility of the power unit and the principal difference between this power unit and others is the fact that the operator is pushed by the power unit inasmuch as he is situated between a pair of handle assemblies which extend forwardly from the power unit.

The principal object and essence of the invention is therefore to provide a device of the character herewithin described which includes a source of power, means engageable with the travel surface to propel the source of power, elongated handle assemblies extending forwardly of the source of power between which the operator is situated, and means convenient to the operator to control the source of power and a breaking assembly incorporated with the unit.

Another object of the invention is to provide a device of the character herewithin described which includes a safety braking device situated intermediate the ends of the handle assemblies and which is actuated as soon as it contacts the travel surface. This safety braking device operates if the operator should fall or if he lowers the handles sufficiently so that the device contacts the travel surface.

A further object of the invention is to provide a device of the character herewithin described which is readily disassembled for storage or carrying in the trunk of a car or the like.

Another object of the invention is to provide a device of the character herewithin described in which the safe braking device operates whether the unit is moving forwardly or rearwardly.

Another object of the invention is to provide a device of the character herewithin described which may include a safety belt or harness for the operator connected to the handle assemblies and also being connected to the braking system.

Still another object of the invention is to provide a device of the character herewithin described which is simple in construction, economical in manufacture, and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:-

BRIEF DESCRIPTION OF THE DRAWINGS

FIG. 3 is a fragmentary side elevation substantially along the line 3—3 of FIG. 2.

FIG. 4 is a fragmentary isometric view of one end of the handle assemblies.

FIG. 5 is a fragmentary isometric view of a portion of the handle assemblies.

FIG. 6 is a side view partially schematic of one form of power showing the interconnection between the throttle and brake thereof.

FIG. 7 is a fragmentary side elevation of an alternative embodiment.

FIG. 8 is a schematic side elevation of a still further embodiment.

FIG 9 is a fragmentary top plan view of FIG. 8.

FIG. 10 is an enlarged side elevation of one of the pontoons of FIGS. 8 and 9.

FIG. 11 is a view similar to FIG. 10 but showing the vane in the downward position.

FIG. 12 is a partially schematic front end view of the vane per se.

FIG. 13 is a fragmentary partially schematic side elevation of the connection between the automatic braking system of FIG. 8.

In the drawings like characters of reference indicate corresponding parts in the different figures.

DETAILED DESCRIPTION

Figure 2:
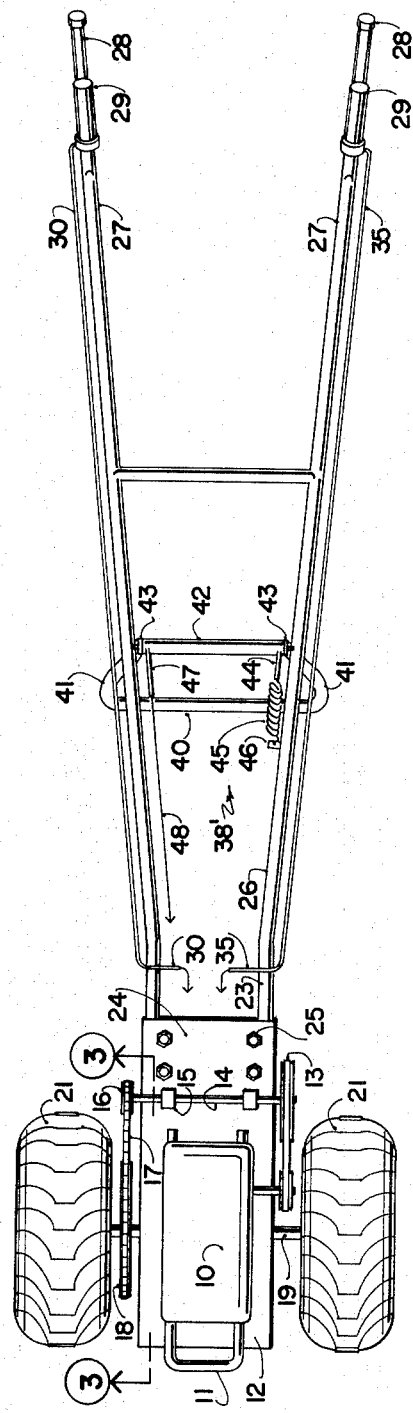
FIG. 2 is a top plan view of FIG. 1.
Figure 1:
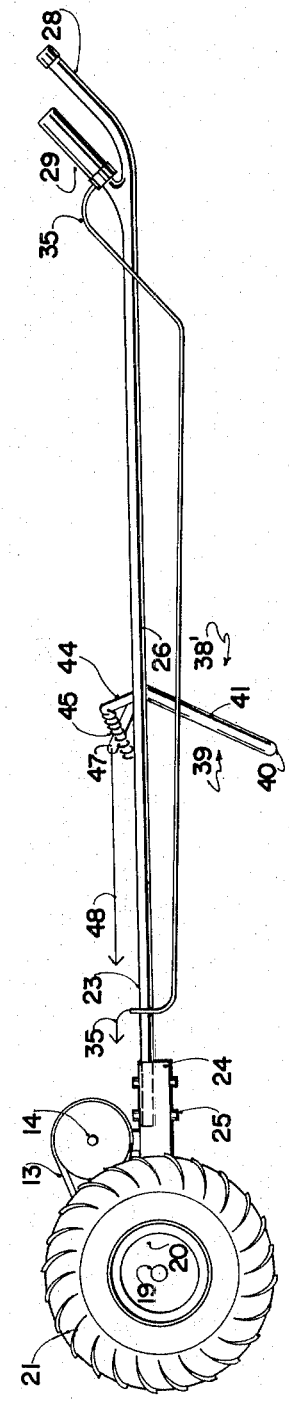
FIG. 1 is a side elevation of one embodiment of the device.

Proceeding therefore to describe the invention in detail, reference should first be made to FIGS. 1 to 5 inclusive.

Reference character 10 illustrates a source of power which, in the drawings, takes the form of a gasoline engine. However, it will be appreciated that other sources of power can be used.

This source of power is mounted in a sub-frame 11 which in turn is supported upon a main frame 12, the various connections being conventional and not shown in the accompanying drawings.

In the embodiment being described, a conventional torque converter (not illustrated), is driven by the motor unit 10 and a chain or V-belt connection 13 extends to a jack shaft 14 journalled within self-adjusting bearings 15 mounted upon the sub-frame 11.

A small sprocket 16 is secured to the jack shaft and a chain 17 extends to a relatively large final drive sprocket 18 which is secured to an axle 19 supported within bearings (not illustrated) which in turn are secured to the main frame 12. In this embodiment, a pair of wheels 20 are secured one upon each end of the axle 19 and are provided with relatively large inflatable tires 21.

It will therefore be seen that the source of power provides propulsion to the unit through the wheels 20.

A pair of handle assemblies collectively designated 22 extend forwardly of the main frame 12 and are secured thereto. In this embodiment, the inner ends 23 of each handle engage between plates 24 and they are clamped between these plates by means of bolt assemblies 25 thus enabling the handle assemblies 22 to be detached for storage and transportation purposes.

Each handle assembly includes a tubular member 26 which diverge upwardly towards the forward ends 27 and details of these forward ends are shown in FIG. 4.

These ends 27 are upwardly curved as shown at 28 to act as guards and runners in the event that the operator falls.

Twist grip controls or the like 29 are secured to the ends 27 of the handle assemblies just inboard of the upwardly curved ends 28 and the operator grasps these twist grip controls, it being understood that the operator is situated between the ends 27 of the handle assemblies.

The twist grip control 29 on the left-hand handle assembly is provided with a conventional sheathed cable assembly 30 which extends along the length of the handle assembly to the source of power and is connected to the throttle lever 31 (shown in FIG. 6), secured to the carburettor 32. This cable is provided with a conventional throttle control cable tension unit 33 and an override spring 34 as clearly shown in FIG. 6.

The other twist grip control 29 on the right-hand handle assembly is provided with a cable assembly 35 which extends to the operating lever 36 of a conventional caliper brake assembly collectively designated 37 supported upon a bracket 38 and adapted to engage the aforementioned relatively large sprocket 18 secured to the main axle shaft 19, details of which are shown in FIG. 3.

One of the principal advantages of utilizing the caliper brake assembly 37 in conjunction with the sprocket 18 is the fact that even if the chain 17 breaks or the belt 13 breaks, the braking system is still effective. However other types of brakes can be used if desired.

A travel-surface-actuated assembly collectively designated 38' is provided intermediate the ends of the handle assemblies 22. It takes the form of a substantially U-shaped member designated 39 which includes a travel surface engaging horizontal portion 40, the two arms 41 and a cross brace 42. The upper ends of the arms 41 are pivotally secured to the handle assembly tubes 26 by means of pivots 43 and a relatively short lever 44 extends rearwardly from the upper end of one of the members 41 and is provided with a spring 45 extending between the lever 44 and an anchor point 46 on one of the handle tubes 26. This tension spring is provided to bias the U-shaped member to the downwardly extended position shown in the drawings.

A further lever 47 extends from the other member 41 and a cable assembly 48 is secured by one end thereof to this lever 47 and extends rearwardly to the aforementioned caliper brake assembly 37.

A lever 49 (see FIG. 3) is pivoted to the frame 11 and extends upwardly therefrom and the cable assembly 48 is adapted to be quick-connected to the upper end of this lever by conventional means (not illustrated). An actuating spring 50 extends between this lever 49 and the aforementioned caliper brake actuating lever 36 so that movement of lever 49 in the direction of arrow 51, actuates the caliper brake assembly independently of the cable assembly 35.

From the foregoing it will be appreciated that if the handle assemblies are lowered either purposely or inadvertently the horizontal portion of the assembly 39 strikes the travel surface whether it be snow or grass or pavement, thus moving the U-shaped member 39 upwardly in the direction of arrow 52 against tension of spring 45 and this automatically actuates the caliper brake assembly 37.

In other words, if the operator falls, the brake is automatically actuated and if he lowers the handle assemblies towards the travel surface, this also will actuate the brake assembly. It should also be noted that the assembly 39 will actuate the brake whether the unit is moving forwardly or rearwardly due to the pivotal mounting thereof and the arrangement of the levers 47 and 49.

A further safety device is provided by the cable assembly 53 which extends from the brake actuating lever 36 to the throttle control lever 31 so that when the brake assembly is actuated either by the twist grip 29 or by the U-shaped member 39, the throttle lever 31 is moved to the closed position regardless of the position of the throttle control twist grip 29, spring 34 permitting this overriding action to take place.

If desired, a harness assembly such as shown in FIG. 4 may be utilized. This consists of an encircling harness collectively designated 54 which is adapted to encircle the waist of the operator. A belt portion 55 extends between the harness and the handle assembly tubes 26 and a cable assembly 56 extends from the belt, around a small pulley 57 in one of the handle assemblies and then rearwardly to the quick-connect lever 49 hereinbefore described and illustrated in FIG. 3. This means that if the operator moves rearwardly towards the source of power, between the handle assemblies, then the brake will automatically be applied and of course the throttle will be closed. This movement may be inadvertent due to falling or may be purposeful if it is desired to control the motion of the machine by this means. This action is assisted by the fact that the cable assembly 56 is shorter than the belt 55 in order that the override system may be applied.

Means are provided to fold the handle assemblies for storage and transportation purposes and details of one embodiment are shown in FIG. 5.

Each handle tube 26 is formed of two portions pivoted together by means of pivot pins 58 just forward of the U-shaped member 39.

Forwardly extending portions 59 are secured to the rear portions 26A of the handle tubes and an overcenter lever 60 is provided upon each of the forward portions 26B of the handle assembly tubes. An encircling member 61 extends around the handle assembly tube portion 26B and the extensions 59 and is pivoted to the lever 60 so that when these levers, which are of the overcenter variety, are in the position shown in FIG. 5, the two handle assembly tubes 26A and 26B are locked together as clearly shown, if the levers 60 are released, then the front handle assembly tubes 26B can be folded rearwardly to overlie the rear handle assembly tubes 26A thus facilitating storage and transportation.

FIG. 7 shows a schematic view of an alternative embodiment in which the two wheels and tires 20 and 21 respectively, are replaced by a relatively small endless track assembly collectively designated 62. However, as details of such assemblies are well known, it is not deemed necessary to describe same further. An alternative method of mounting the handle assemblies is shown in this particular embodiment in which each of the handle assembly tubes 26 extend rearwardly on each side of the frame 12 and are pivotally connected to the frame by means of pivot pins 63. A vertically spaced bracket 64 is also secured to the front of the frame 12 and the handles may move vertically around the pivots 63 limited by the vertical brackets 64. This gives more flexibility to the position of the handle assemblies relative to the operator's hands.

If it is desired to use the unit on water, then the embodiment shown in FIGS. 6 and 8 to 13 inclusive should be used.

The travel surface engaging members instead of being wheels or a track, take the form of a pair of floatation pontoons 65 one upon each side of a cross frame 12A and a conventional outboard motor shown schematically by reference character 66, is mounted upon this cross frame 12A so that the propeller assembly 67 extends downwardly into the water below the pontoons 65.

The control of the outboard motor 66 is similar to that of the previous embodiment, namely through one of the twist grips 29 and floatation means 68 are provided on the underside of each of the handle assembly tubes 26 so that the handle assemblies will float if they are disengaged by the operator.

The brake means in this embodiment takes the form of a vane assembly 69 in conjunction with one of the pontoons 65 and FIGS. 10 and 11 show one embodiment of this. The vane assembly consists of a rudder like vane having a triangular front configuration as shown in FIG. 12. It is pivoted to the rear of the pontoon upon the underside thereof as indicated by reference character 70 and normally forms part of the pontoon under surface as clearly shown. A control or guide member 71 extends upwardly from the front end of the vane assembly 69, through the pontoon to the upper side thereof as clearly shown in FIGS. 10 and 11. An enlarged portion 72 is formed on the upper end of this guide bar to limit the downward movement thereof and a relatively heavy coil spring 75 reacts between a pocket 74A formed in the underside of the pontoon, and the vane assembly 69 normally biassing the vane assembly to the down or open position shown in FIG. 11. However, the vane assembly 69 is normally held in the uppermost position shown in FIG. 10 by means of a relase and locking pin assembly 73 extending around the guide bar 71 and being controlled by means of a cable assembly 74 which extends to the travel-surface-actuated assembly collectively designated 38A in this embodiment. The construction is similar to that hereinbefore described with the exception that a floatation portion 75A is provided on the horizontal cross bar 40. Once again if the handle assemblies are released either accidentally or purposely, the floatation device 75A strikes the surface of the water which actuates the assembly in a manner similar to that hereinbefore described and releases the release and locking pin assembly 73 so the spring 75 immediately extends the vane assembly into the water below the pontoon 65. The configuration of this vane assembly as shown in FIG. 12, not only arrests the forward motion of the unit, but also veers it to one side of the direction of travel so that it cannot override the operator. Once again the brake assembly is connected to the throttle lever as illustrated in FIG. 6. Also, of course, means are provided to actuate this device by hand if desired.

The connection between the U-shaped member 39A and the cable assembly 74 is shown in detail in FIG. 13 which illustrates the upper end of one of the vertical portions 41A of the U-shaped member pivoted to the tube 26 by means of pivot pin 43A. The other end of cable assembly 74 is secured to the upper end of the lever 76 pivoted intermediate the ends thereof upon pins 77, to the handle assembly tube 26.

A pin 78 extends from the other end of the lever 76 and is normally engaged by a catch plate 79 pivotally secured to the member 41A. This catch plate 79 is provided with a spring 80 which normally biasses this catch plate downwardly. However, it is held in position shown in FIG. 13 by the compression of spring 75 between the pontoons 65 and the vane 69.

When the U-shaped member strikes the water, it is moved rearwardly in the direction of arrow 52. The difference in distance between pivot pin 77 and pivot pin 78, and pivot pin 78 and pivot pin 43A, releases catch plate 79 from pin 78 upon movement in direction of arrow 52. During this action cable 74 is pulled forwardly to release locking pin assembly 73 from unit 71. A stop pin 78A attached to 41A as shown, limits downward movement of catch plate 79 due to spring 80, hence permitting pin 78 to clear and also to hold catch plate 79 in proper position for resetting.

Upon release of the safety rudder to the safety position, means are provided (not illustrated) to idle the motor throttle and to disengage the propeller or take same out of gear. A reset mechanism is provided on handle 26 adjacent the front ends thereof which resets the entire safety system. That is, it puts the motor in gear, and relatches the safety rudder back to the normal throttle position.

The harness for the operator in the water model operates in a similar manner to the harness on the land model and although same is not illustrated incorporated with the water model, it is to be understood that it can be so incorporated if desired. It maintains the position of the operator relative to the machine but when stressed beyond a preset point, it triggers the safety shut down mechanism so that the motor is de-throttled, taken out of gear and the water brake is activated thus stopping and veering the unit to one side. In other words the action here is similar to the action triggered when the travel-surface-activated lever touches the water surface.

A safety reset device (not illustrated) is built into the machine which enables the operator, once the safety system has been triggered and a stop made, to reset the entire mechanism by pulling the aforementioned lever on the handle so that the unit is ready to resume operation.

This handle control is shown in FIG. 8 and consists of a handle lever 81 pivoted upon a pivot pin 81A and normally lying in the position shown in FIG. 8. This lever or handle 81 can be moved in the direction of arrow 82 thus pulling on a cable 83 which extends rearwardly to the pontoon 65 and is shown in FIG. 11. It passes around a sheave 84, situated on top of the pontoon and thence downwardly through an aperture within the pontoon to be connected to the vane assembly 69, being connected to the upper side thereof as indicated by reference character 85.

Movement of the lever forwardly or in the direction of arow 82, pulls the vane upwardly against pressure of spring 75 thus allowing latch 73 to engage same and hold it in the uppermost position until triggered.

Finally it should be stressed that the source of power should be placed slightly forwardly in the assembly so that when the handle assemblies are released by the operator, they automatically move downwardly in order to ensure that the travel surface actuating assembly strikes the travel surface and actuates the safety mechanisms.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. A mobile power unit adapted to be used on a land or water travel surface; comprising in combination a frame, a source of power in said frame, means engaging the travel surface for support of said frame, means extending between the source of power and the travel surface to propel said unit across said travel surface, brake means on said unit, a pair of handle assemblies secured by one end thereof to said frame and extending forwardly thereof, means on the other ends of said handles operatively connected to said source of power and to said brake means, and a travel-surface-actuated assembly on said handle assemblies intermediate the ends thereof and being connected to said brake means whereby the contacting of said travel surface by said travel-surface-actuated assembly, actuates said brake means.

2. The unit according to claim 1 in which said handle assemblies are provided with upwardly curved ends at said other ends thereof, hand controls for said source of power and for said brake means extending upwardly from said handle assemblies inboard of said upwardly curved ends whereby said upwardly curved ends act as guards for the hands of the operator.

3. The unit according to claim 1 in which said travel-surface-actuated assembly includes a substantially U-shaped member pivoted by an upper end thereof between said handle assemblies intermediate the ends thereof and extending downwardly therefrom, spring means extending between said member and one of said handle assemblies normally biassing said member in the downwardly extending position, lever means extending from the upper end of said member and means extending between said lever means and said brake means whereby movement of said member towards said handle assemblies both forwardly and rearwardly, actuates said brake means.

4. The unit according to claim 2 in which said travel-surface-actuated assembly includes a substantially U-shaped member pivoted by an upper end thereof between said handle assemblies intermediate the ends thereof and extending downwardly therefrom, spring means extending between said member and one of said handle assemblies normally biassing said member in the downwardly extending position, lever means extending from the upper end of said member and means extending between said lever means and said brake means whereby movement of said member towards said handle assemblies both forwardly and rearwardly, actuates said brake means.

5. The unit according to claim 1 in which said handle assemblies are foldable for storage and transportation and include means to detachably lock said handle assemblies in the extended position.

6. The unit according to claim 2 in which said handle assemblies are foldable for storage and transportation and include means to detachably lock said handle assemblies in the extended position.

7. The unit according to claim 3 in which said handle assemblies are foldable for storage and transportation and include means to detachably lock said handle assemblies in the extended position.

8. The unit according to claim 4 in which said handle assemblies are foldable for storage and transportation and include means to detachably lock said handle assemblies in the extended position.

9. The unit according to claim 3 which includes a pair of spaced pontoons secured to said frame, said source of power being mounted between said pontoons, and a propeller driven by said source of power, said U-shaped member including flotation means on a lower end thereof, said handles including flotation means towards said other ends thereof, said brake means including a vane assembly on one of said pontoons engageable with the water when said brake means is actuated, said vane means opposing the forward motion of said unit and deflecting same to one side of the direction of travel thereof.

10. The Unit according to claim 4 which includes a pair of spaced pontoons secured to said frame, said source of power being mounted between said pontoons, and a propeller driven by said source of power, said U-shaped member including flotation means on a lower end thereof, said handles including flotation means towards said other ends thereof, said brake means including a vane assembly on one of said pontoons engageable with the water when said brake means is actuated, said vane means opposing the forward motion of said unit and deflecting same to one side of the direction of travel thereof.

11. The unit according to claim 7 which includes a pair of spaced pontoons secured to said frame, said source of power being mounted between said pontoons, and a propeller driven by said source of power, said U-shaped member including flotation means on a lower end thereof, said handles including flotation means towards said other ends thereof, said brake means including a vane assembly on one of said pontoons engageable with the water when said brake means is actuated, said vane means opposing the forward motion of said unit and deflecting same to one side of the direction of travel thereof.

12. The unit according to claim 8 which includes a pair of spaced pontoons secured to said frame, said source of power being mounted between said pontoons, and a propeller driven by said source of power, said U-shaped member including flotation means on a lower end thereof, said handles including flotation means towards said other ends thereof, said brake means including a vane assembly on one of said pontoons engageable with the water when said brake means is actuated, said vane means opposing the forward motion of said unit and deflecting same to one side of the direction of travel thereof.

13. The unit according to claim 1 which includes an operator harness secured to one of said handle assemblies adjacent said other end thereof, cable means extending between said harness and the other of said handle assemblies, said last mentioned cable means extending to said brake means whereby a rearward movement of said harness towards said source of power actuates said brake means, said source of power including a throttle lever, and means interconnected between said brake means and said throttle lever whereby actuation of said brake means closes said throttle lever.

14. The unit according to claim 2 which includes an operator harness secured to said handle assemblies adjacent said other end thereof, cable means extending between said harness and the other of said handle assemblies, said last mentioned cable means extending to said brake means whereby a rearward movement of said harness towards said source of power actuates said brake means, said source of power including a throttle lever, and means interconnected between said brake means and said throttle lever whereby actuation of said brake means closes said throttle lever.

15. The unit according to claim 3 which includes an operator harness secured to said handle assemblies adjacent said other end thereof, cable means extending between said harness and the other of said handle assemblies, said last mentioned cable means extending to said brake means whereby a rearward movement of said harness towards said source of power actuates said brake means, said source of power including a throttle lever, and means interconnected between said brake means and said throttle lever whereby actuation of said brake means closes said throttle lever.

16. The unit according to claim 4 which includes an operator harness secured to said handle assemblies adjacent said other end thereof, cable means extending between said harness and the other of said handle assemblies, said last mentioned cable means extending to said brake means whereby a rearward movement of said harness towards said source of power actuates said brake means, said source of power including a throttle lever, and means interconnected between said brake means and said throttle lever whereby actuation of said brake means closes said throttle lever.

17. The unit according to claim 5 which includes an operator harness secured to said handle assemblies adjacent said other end thereof, cable means extending between said harness and the other of said handle assemblies, said last mentioned cable means extending to said brake means whereby a rearward movement of said harness towards said source of power actuates said brake means, said source of power including a throttle lever, and means interconnected between said brake means and said throttle lever whereby actuation of said brake means closes said throttle lever.

18. The unit according to claim 6 which includes an operator harness secured to said handle assemblies adjacent said other end thereof, cable means extending between said harness and the other of said handle assemblies, said last mentioned cable means extending to said brake means whereby a rearward movement of said harness towards said source of power actuates said brake means, said source of power including a throttle lever, and means interconnected between said brake means and said throttle lever whereby actuation of said brake means closes said throttle lever.

19. The unit according to claim 7 which includes an operator harness secured to said handle assemblies adjacent said other end thereof, cable means extending between said harness and the other of said handle assemblies, said last mentioned cable means extending to said brake means whereby a rearward movement of said harness towards said source of power actuates said brake means, said source of power including a throttle lever, and means interconnected between said brake means and said throttle lever whereby actuation of said brake means closes said throttle lever.

20. The unit according to claim 8 which includes an operator harness secured to said handle assemblies adjacent said other end thereof, cable means extending between said harness and the other of said handle assemblies, said last mentioned cable means extending to said brake means whereby a rearward movement of said harness towards said source of power actuates said brake means, said source of power including a throttle lever, and means interconnected between said brake means and said throttle lever whereby actuation of said brake means closes said throttle lever.

* * * * *